United States Patent
Frencel et al.

(10) Patent No.: US 8,195,153 B1
(45) Date of Patent: Jun. 5, 2012

(54) MOBILE ACCESS TO BACKUP AND RECOVERY SERVICES

(75) Inventors: Tom Frencel, Bolton (CA); Suavek Zajac, Oakville (CA)

(73) Assignee: EMC Corporation, Hopkinton, MA (US)

( * ) Notice: Subject to any disclaimer, the term of this patent is extended or adjusted under 35 U.S.C. 154(b) by 1313 days.

(21) Appl. No.: 11/211,050

(22) Filed: Aug. 23, 2005

(51) Int. Cl.
 *H04W 4/00* (2009.01)
(52) U.S. Cl. ............ 455/433; 455/414.2; 370/260; 340/995.24; 711/161; 711/162; 709/217; 710/100
(58) Field of Classification Search .......... 455/433, 455/414.2; 709/219, 217; 710/100; 711/161, 711/162; 714/6; 707/203; 340/995.24; 370/260
See application file for complete search history.

(56) References Cited

U.S. PATENT DOCUMENTS

| | | | | |
|---|---|---|---|---|
| 6,266,721 | B1 * | 7/2001 | Sheikh et al. | 710/100 |
| 6,333,973 | B1 * | 12/2001 | Smith et al. | 379/88.12 |
| 6,418,324 | B1 * | 7/2002 | Doviak et al. | 455/426.1 |
| 6,724,730 | B1 * | 4/2004 | Mlinarsky et al. | 370/241 |
| 6,781,963 | B2 * | 8/2004 | Crockett et al. | 370/260 |
| 6,798,358 | B2 * | 9/2004 | Joyce et al. | 340/995.24 |
| 6,910,112 | B2 * | 6/2005 | Berkowitz et al. | 711/162 |
| 2002/0081995 | A1 * | 6/2002 | Leppinen et al. | 455/412 |
| 2002/0156921 | A1 * | 10/2002 | Dutta et al. | 709/246 |
| 2003/0134625 | A1 * | 7/2003 | Choi | 455/418 |

OTHER PUBLICATIONS

Eric Giguere, Client-Server Communications between MIDlets and Servlets, Aug. 20, 2001.
Sun Microsystems, Designing Wireless Clients for Enterprise Applications with Java Technology, Jun. 26, 2003.
David Hemphill, J2ME and J2EE: Together At Last, Apr. 2002.
Gabhart et al., Wireless Web Service with J2ME Remote Possibilities, Web Services Journal, vol. 2, Issue 1, Jan. 11, 2002.
Gabhart et al., Wireless Web Services with J2ME Part II SOAP or XML-RPC? The answer depends on your needs, Web Services Journal, vol. 2, Issue 2, Feb. 1, 2002.
Eric Giguere, Parsing XML in CLDC-Based Profiles,Wireless Tech Tips, J2ME Tech Tips: Jul. 25, 2001.
Eric Giguere, Compressing XML for Faster Wireless Networking, Wireless Tech Tips, J2ME Tech-Tips: Mar. 25, 2002.

* cited by examiner

*Primary Examiner* — Nimesh Patel
(74) *Attorney, Agent, or Firm* — Van Pelt, Yi & James LLP

(57) ABSTRACT

Providing access to a backup application is disclosed. A request to access a service associated with a backup application is received via a mobile telecommunication network from a client running on the mobile telecommunication device. The backup application is communicated with on behalf of the client running on the mobile telecommunication device to provide access to the service associated with a backup application.

29 Claims, 12 Drawing Sheets

MOBILE ACCESS TO BACKUP AND RECOVERY SERVICES

BACKGROUND OF THE INVENTION

Individuals responsible for data backups and others may wish to have remote access to a backup application, e.g., to monitor and/or control backup operations. Some backup and recovery applications are accessible from a website, which enables the backup and recovery application to be accessed from a location in which a computer configured with web browser software and Internet access is available. Remote access via a web interface may be extended by using a web browser on a laptop or other computing device with a wireless connection, such as WiFi; however, the coverage area for a WiFi network typically only provides a localized extension of coverage of a wired data network. In addition, a browser-enabled interface typically would not be suitable and/or convenient for use in connection with devices having a display that is smaller and/or has a different form factor from a typical desktop and/or laptop computer, such as a mobile phone or personal digital assistant (PDA). Therefore, there is a need for a way to access a backup application in circumstances in which it may not be convenient and/or possible to access the application via a website, e.g., where it would be inconvenient, impractical, or not possible to use a computer with a web browser and/or in locations, such as while driving, in which Internet access typically is not available, and/or using a device that has a different display size and/or form factor than a typical computer.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing access to a backup application via a mobile telecommunication device is disclosed. In some embodiments, the mobile telecommunications device comprises a mobile phone and access is provided at least in part via a mobile telephone network infrastructure. In some embodiments, access is provided to one or more services associated with a backup application. Some examples of services include checking the status of a backup or recovery job, initiating a backup, and configuring a device with backup related information. A request to access a service is received from a client running on the mobile telecommunication device via a mobile telecommunication network. Communication with the backup application is performed on behalf of the client. In some embodiments, a mobile gateway creates a virtual client to interface with a backup server associated with the backup application. In some embodiments, security information is exchanged to authenticate a user of the mobile telecommunication device and/or the device itself. A profile of the user may be available to the backup application and used to determine access privileges.

Figure 1:
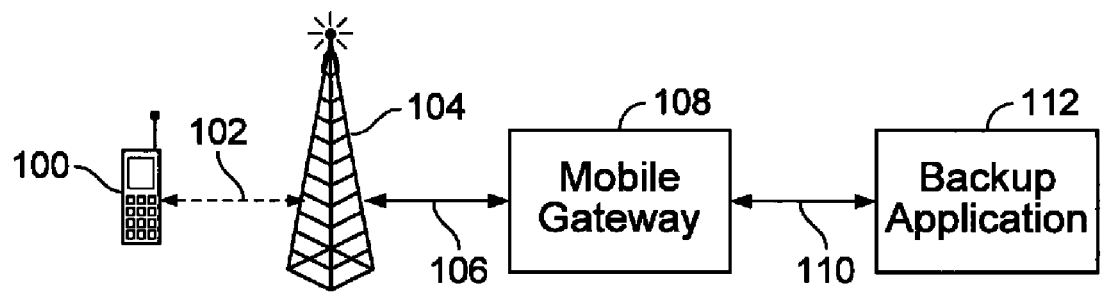
FIG. 1 is a diagram illustrating an embodiment of a system for accessing a service associated with a backup application using a mobile telecommunication device.

FIG. 1 is a diagram illustrating an embodiment of a system for accessing a service associated with a backup application using a mobile telecommunication device. In the example shown, a user associated with a mobile telecommunication device 100 accesses a service associated with backup application 112 via a client, e.g., an application, applet, or other installed code, on mobile telecommunication device 100. Mobile telecommunication device 100 may be a mobile phone or any other device configured to communicate via a mobile telecommunication network. As used herein, the term "mobile telecommunication network" refers to a communication network configured to enable a user to establish, from a point within a geographic or other service area associated with the mobile telecommunication network, a communication session with a destination associated with the mobile telecommunication network—e.g., another user or node on that network, or a destination accessible via one or more other networks or group(s) of networks accessible via the mobile telecommunication network—and maintain such a connection even while moving from one location to another so long as the user remains within a service area associated with the mobile telecommunication network. Examples of a mobile telecommunications network include, without limitation, mobile telephone networks, such as Global System for Mobile Telecommunication (GSM) networks, General Packet Radio Service (GPRS) networks, and mobile telephony networks based on other standards. In the example shown, mobile telecommunication device 100 communicates with backup application 112 through a mobile telecommunication link 102, a base station 104, a network connection 106, a mobile gateway 108, and a network connection 110. In some embodiments, mobile telecommunication link 102 includes a wireless communication path. In some embodiments, base station 104 comprises a station at which wireless communications may be received from a wireless telecommunication device, such as mobile telecommunication device 100, and sent on to a further destination through a wireless and/or wired connection such as network connection 106. In some embodiments, base station 104 comprises a station at which communications received from an upstream node, e.g., through a wireless and/or wired connection such as network connection 106, may be transmitted to a wireless telecommunication device, such as mobile telecommunication device 100. In some embodiments, base station 104 comprises a GSM tower. In some embodiments, base station 104 comprises a mobile telecommunication service provider gateway configured to connect the mobile telecommunication network to the Internet. Network connection 106 may include one or more separate networks, each of which may be wireless or wired. In some embodiments, network connection 106 includes the public switched telephone network (PSTN). In some embodiments, network connection 106 includes the Internet. Mobile gateway 108 in some embodiments includes a gateway configured to send/receive via the Internet data associated with communications provided at least in part via a mobile telecommunication network. In some embodiments, gateway 108 comprises a gateway associated with an enterprise or other private network, configured to facilitate communication via the Internet between one or more internal hosts associated with the enterprise network and a user of a mobile equipment associated with a mobile telecommunication network. In some embodiments, mobile gateway 108 comprises a web server. In some embodiments, a client running on mobile telecommunication device 100 communications with backup application 112, via the communication path described above, to provide access to backup application 112.

A variety of services associated with backup application 112 are accessible from the client on mobile telecommunication device 100. Services associated with backup application 112 may include backup related services and recovery related services. In various embodiments, restarting a failed backup, checking backup and recovery status, viewing an error log, accessing data, and initiating a backup may be performed using mobile telecommunication device 100. Configuration of devices associated with backup and recovery may also be performed. A storage device used to store backup data, such as a tape drive or a disk drive, may be mounted and recovery settings for a computer to be recovered may be configured.

Mobile gateway 108 facilitates communication between the client on mobile telecommunication device 100 and backup application 112. In some embodiments, mobile gateway 108 transforms information exchanged between the client on mobile telecommunication device 100 and backup application 112. For example, communication between mobile telecommunication device 100 and mobile gateway 108 may be compressed to reduce the transmission bandwidth over mobile telecommunication connection 102 and the storage and processing burden on mobile telecommunication device 100. Mobile gateway 108 may uncompress or use a lookup table to expand communications received from mobile telecommunication device 100. Appropriate inverse functions are applied in the other direction to data sent to mobile telecommunication device 100.

Communication may be further transformed or augmented before being presented to backup application 112. For example, default values may be maintained at the mobile gateway and added to communications sent to backup application 112. Mobile telecommunication device 100 may then leave a field blank and mobile gateway 108 inserts the value before presenting a communication to backup application 112.

Data may also be packaged using a variety of different communication schemas. The communication schema may be selected based on the desired performance of the system. Optimized binary, serialized objects, Extensible Markup Language (XML), Extensible Markup Language-Remote Procedure Call (XMP-RPC), and Simple Object Access Protocol (SOAP) are some example schemas.

Mobile gateway 108 is coupled to backup application 112 by connection 110. In some embodiments, mobile gateway 108 and backup application 112 are in the same network. For example, both may be within a company's secured network. In some embodiments, mobile gateway 108 includes security features. For example, mobile gateway 108 may include a firewall to prevent unauthorized access to backup application 112. Information exchanged between mobile gateway 108 and a client on mobile telecommunication device 100 may also be encrypted, for example, to secure communication outside of a company's secured network.

In some embodiments, some services associated with backup application 112 are not available using a mobile telecommunication device. For example, in some embodiments services associated with reading data are permitted, but services that write, delete, or otherwise change data are not be permitted. In some embodiments, a user of a mobile telecommunication device is allowed to review the status of a backup but cannot initiate a backup.

A reduced set of services available through a client on mobile telecommunication device 100 may be for a variety of reasons. Mobile telecommunication device 100, or a client running on it, may only be able to support a reduced set of services because of device constraints, such as memory limitations, processing performance, power consumption, or bandwidth constraints over wireless telecommunication connection 102. The reduced set of services may also be motivated by security considerations. For example, unauthorized access may be a concern. To reduce the potential damage inflicted during an unauthorized access, only a reduced set of services through the client on the mobile telecommunication device may be supported. In some embodiments, all services associated with backup application 112 may be accessed via mobile telecommunication device 100 by at least a subset of users.

Using a mobile telecommunication device to access a backup application in some embodiments enables a user to access the backup application from any location in which the mobile telecommunication device has service. Mobile telecommunication networks may span large areas. For example, many areas of the United States, Canada, and other countries are covered by mobile telecommunication networks. A user accessing the backup application through a client on a mobile telecommunication device may be able to continually access the backup application while, for example, driving on the freeway. Coverage may be continuous for many miles and transitioning from one tower to another may be transparent to a user.

Accessing the backup application from a client on a mobile telecommunication device may reduce the number of devices in a user's possession. For example, a system administrator may want to check the weekend's scheduled backup while out of town. Using the client running on her mobile phone, she is able to view the status of the backup and may be able to leave her laptop at home. Her mobile phone may be smaller than her laptop and may be a device she typically carries with her. Rather than bringing both her laptop and her mobile phone, she may be able to reduce the number of devices in her possession and still access backup and recovery services.

Using a client running on the mobile telecommunication device, instead of browser software, to provide remote access to a backup application makes it possible to provide to a user of the mobile telecommunication device a more functional and rich interface and more features than typically could be provided, for example, by using browser software running on the mobile telecommunication device to access the backup application via a web interface. In some embodiments, the client is configured to display content, e.g., in a manner that is optimized for the particular platform on which the client is running. In addition, in some embodiments, the client is configured to use codes or other data values to communicate with the backup application in a manner that minimizes the amount of data that must be sent over the limited bandwidth mobile telecommunications network. For example, the client may use the code "1" to request the status of all currently pending backup operations. The backup application and/or an intermediary may similarly be configured to use lightweight codes or other data values to encode responses, which codes may be interpreted by the client running on the mobile telecommunication device, which would then display the decoded response data to the user.

Figure 2:
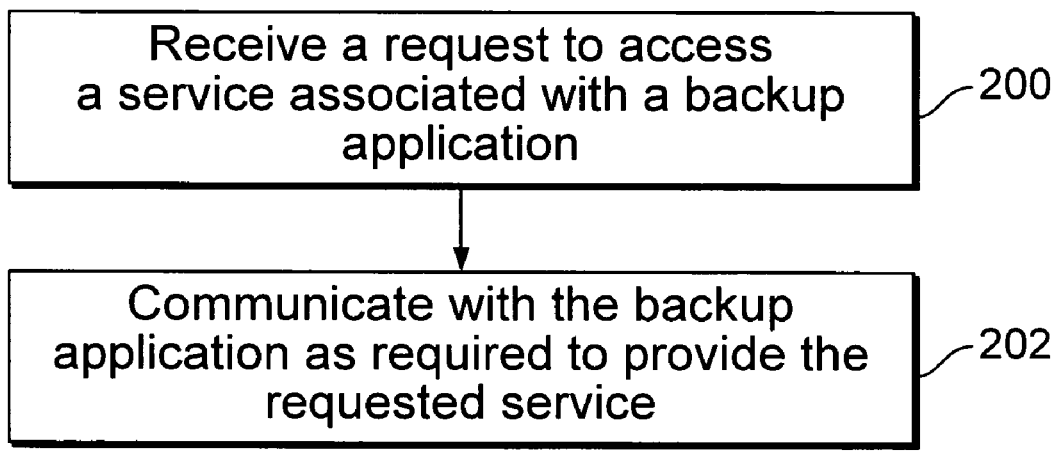
FIG. 2 is a flowchart illustrating an embodiment of a process for providing remote access to a backup application.

FIG. 2 is a flowchart illustrating an embodiment of a process for providing remote access to a backup application. In some embodiments, the process of FIG. 2 is implemented at a mobile gateway such as mobile gateway 108 of FIG. 1. In the example shown, at 200 a request to access a service associated with a backup application is received. In some embodiments, the request is received from a client running on a mobile telecommunication device. For example, a client running on a mobile telephone may send a request to restart a failed backup. The request may be received from a wireless telecommunication network, such as a GSM or CDMA network. The client running on the mobile telecommunication device may be an applet, an application, or an executable. Viewing backup and recovery status, reading an error log, initiating a backup, restarting a failed backup, mounting a storage device used to backup data, configuring a storage device (e.g., a tape drive), and labeling or otherwise configuring one or more volumes of removable storage media are some examples of services associated with a backup application. A service may be any function or feature of a backup application and may include any information that may be obtained from the backup application and/or any operation, function, task, or portion thereof that the backup application is configured to perform.

At 202, the backup application is communicated with as required to provide the requested service. In some embodiments, the communication performed in 202 is conducted on behalf of a client running on a mobile telecommunication device from which the request received at 200 was received. In some embodiments, at 202 a virtual client is instantiated and associated with the requesting client, and the virtual client is used to communicate with the backup application on behalf of the client. Information relating to the user or the mobile telecommunication device, such as identification information, may be exchanged. Some requested services of the backup application may return data from the backup application, such as a requested error log, the status of a recovery job, or requested backup configuration data. In some embodiments, for at least certain services there is no data returned by the backup application. Communication with the backup application may include security related information.

In some embodiments, the process of FIG. 2 is performed by a mobile gateway. For example, a backup application may receive requests from a number of clients to access services associated with backup and recovery. The mobile gateway may create a virtual client to interface to the backup application and communication with the backup application is performed using the virtual client. The virtual client associated with a mobile telecommunication device may be configured to interact with the backup application in a manner that is similar, at least with respect to those services made available via the mobile telecommunication device, to a client that is not associated with a mobile telecommunication device. In some embodiments, a new virtual client is created for each mobile telecommunication device that requests access to services of the backup application. Communicating through a virtual client may reduce the number of changes to the backup application to support access from a client on a mobile telecommunication device. Existing interfaces to the backup application may be reused if the virtual client is similar to the existing client design. Using a virtual client may also allow for homogenous communication and uniform access control policies. Regardless of the source of the access request, the same access control policy may be applied. In some embodiments, the virtual client—and/or a virtual client manager with which the virtual client is associated—is configured to receive relatively lightweight communication from the client on the mobile telecommunication device, determine based on the lightweight communication what service is required, and communicate with the backup application as required, in the same or a similar manner as a client running on a host on the local (e.g., enterprise) network with which the backup application is associated, to cause the backup application to perform/provide the service requested using the client on the mobile telecommunication device.

Figure 3:
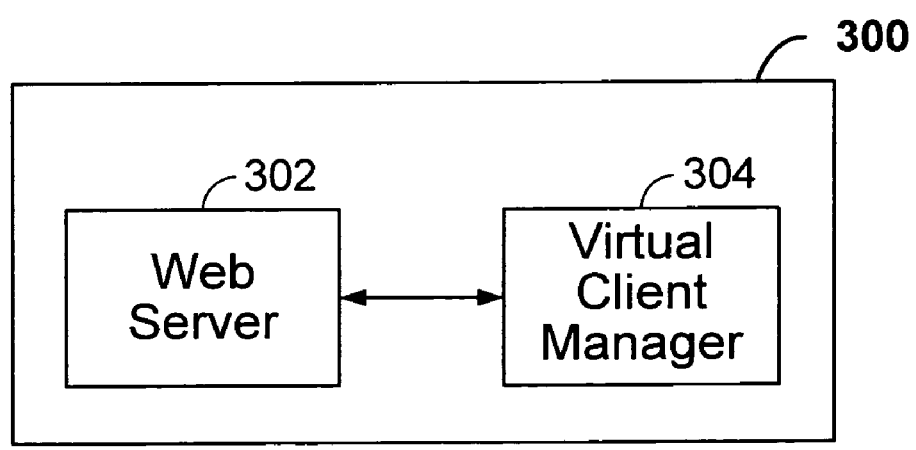
FIG. 3 illustrates a block diagram of an embodiment of a mobile gateway.

FIG. 3 illustrates a block diagram of an embodiment of a mobile gateway. In the example shown, a mobile telecommunication device (not shown) communicates with mobile gateway 300 via the Internet. In some embodiments, the mobile gateway 300 includes a communication interface, such as a network interface card (NIC), configured to enable the mobile gateway 300 to receive data via the Internet. In some embodiments, data is exchanged according to the Secure Hypertext Transfer Protocol (HTTPS). To support the HTTPS protocol, web server 302 is included in mobile gateway 300. Web server 302 supports the functions needed to exchange information with mobile telecommunication device in the HTTPS protocol.

Web server 302 is coupled to virtual client manager 304. The information exchanged between web server 302 and virtual client manager 304 may include a request to access a backup application. In some embodiments, web server 302 removes HTTPS transport information prior to passing a received request on to virtual client manager 304. Virtual client manager 304 creates and manages virtual clients to communicate with the backup application. Response data, if any, received from the backup application is passed by virtual client manager 304 to web server 302, and web server 302 sends the response data to the mobile telecommunication device using the HTTPS protocol.

Virtual client manager 304 may perform a variety functions on the information exchanged with web server 302 before communicating with the backup application through the virtual client. For example, information from a mobile telecommunication device may be encrypted and virtual client manager 304 may decrypt the information. Information from a mobile telecommunication device may be compressed. Virtual client manager 304 may decompress the information according to an algorithm. Or, virtual client manager 304 may maintain a lookup table containing a list of codes. Some codes may correspond to requests for a particular backup application service. Other information, (such as error messages, replies, security related information, and identification information) may similarly be stored. Appropriate inverse processing may be performed on information transmitted in the opposite direction.

In some embodiments, a virtual client created by virtual client manager 304 is indistinguishable to the backup application from a client not associated with a mobile telecommunication device. For example, a virtual client created by virtual client manager may be indistinguishable from a client associated with a user accessing the backup application from a website using a computer. In some embodiments, a backup application is able to determine that the virtual client is associated with a client on a mobile telecommunication device.

Although the example illustrated uses the HTTPS protocol, other protocols (including HTTP) may be used to exchange information. Appropriate changes to mobile gateway 300 reflect the protocol selected. For example, if the HTTP(S) protocol is not used, web server 302 may not be included in mobile gateway 300. Similarly, a virtual client manager may not be included in the mobile gateway if a client/server structure is not used.

Figure 4:
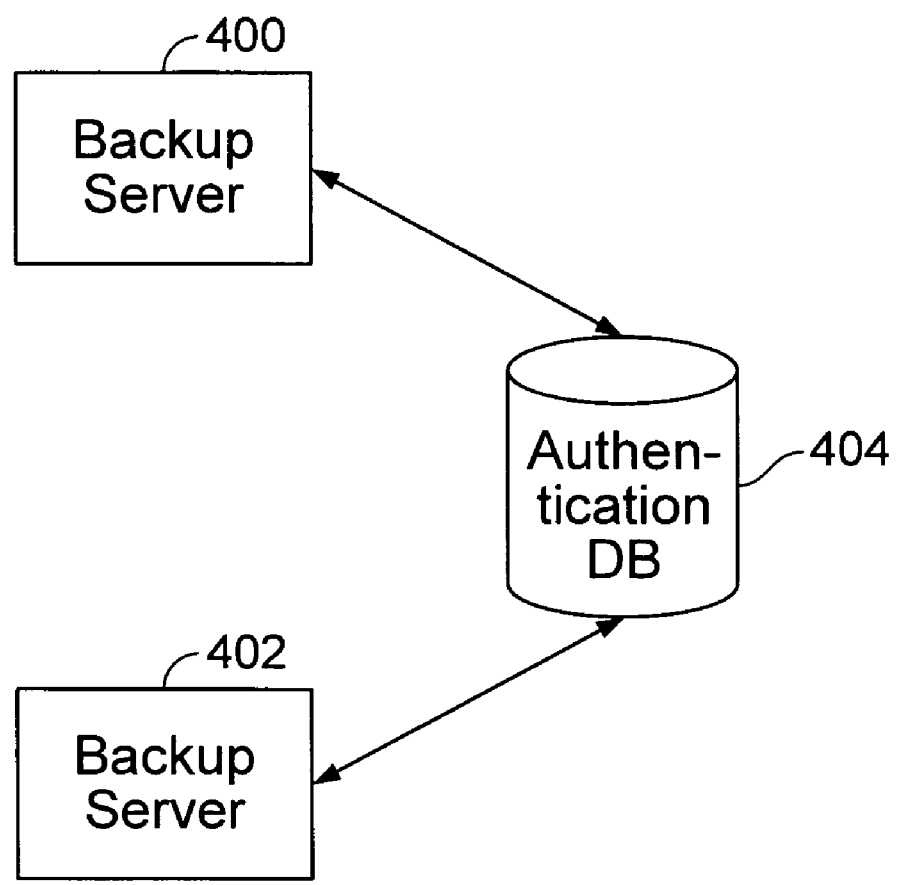
FIG. 4 is a block diagram illustrating an embodiment of network elements associated with a backup application.

FIG. 4 is a block diagram illustrating an embodiment of network elements associated with a backup application. In the example shown, backup servers 400 and 402 are coupled to authentication database 404. Backup servers 400 and 402 support clients requesting access to services associated with a backup application. In some embodiments, backup servers 400 and 402 service virtual clients associated with clients running on mobile telecommunication devices as well as other clients. In some embodiments, virtual clients associated with clients running on mobile telecommunication devices are supported by one or more dedicated backup servers.

Authentication database 404 is used to store authentication information. In some embodiments, authentication of a user is performed before a request to access a backup application is granted. Identification of the user is obtained. The request may include the user identification, or an identification request and response exchange may be triggered by a request to access a backup service. Based on the user, a profile is retrieved from authentication database 404. If there is no profile associated with the user identification, in some embodiments the request to access the backup application service is denied. Security related information may be exchanged before the request to access the backup application is granted. For example, a user may be asked for a password kept in a profile stored in authentication database 404. In some embodiments, authentication and other security related procedures are not performed.

Privileges may also be determined using authentication database 404. In some embodiments, some users accessing a backup application using a client running on a mobile telecommunication device may only access a reduced set of services that includes a subset of the services made available to the same user when the user accesses the backup application by some other way, e.g., by using a client installed on an internal host associated with the network. A profile stored on authentication database 404 may specify the reduced set of services (corresponding to access using the client running on a mobile telecommunication device) as well as the normal set of services (corresponding to access by another method). For example, a junior system administrator may be able to review the status of backups as well as initiate backups when accessing backup services using his office computer with a backup application client, agent, or other component installed on it. When the request originates from a client running on his mobile telecommunication device, the junior system administrator is only able to review the status of backups. In some embodiments, at least certain users are able to access the same services using a client running on a mobile telecommunication device they normally are permitted to access.

Although the figure illustrates two backup servers and one authentication database, any number of backup servers or authentication databases may be used. For example, the authentication database may be duplicated and two identical authentication databases may exist. Or, the information contained in the authentication databases may be divided and contained in multiple authentication databases.

Figure 5A:
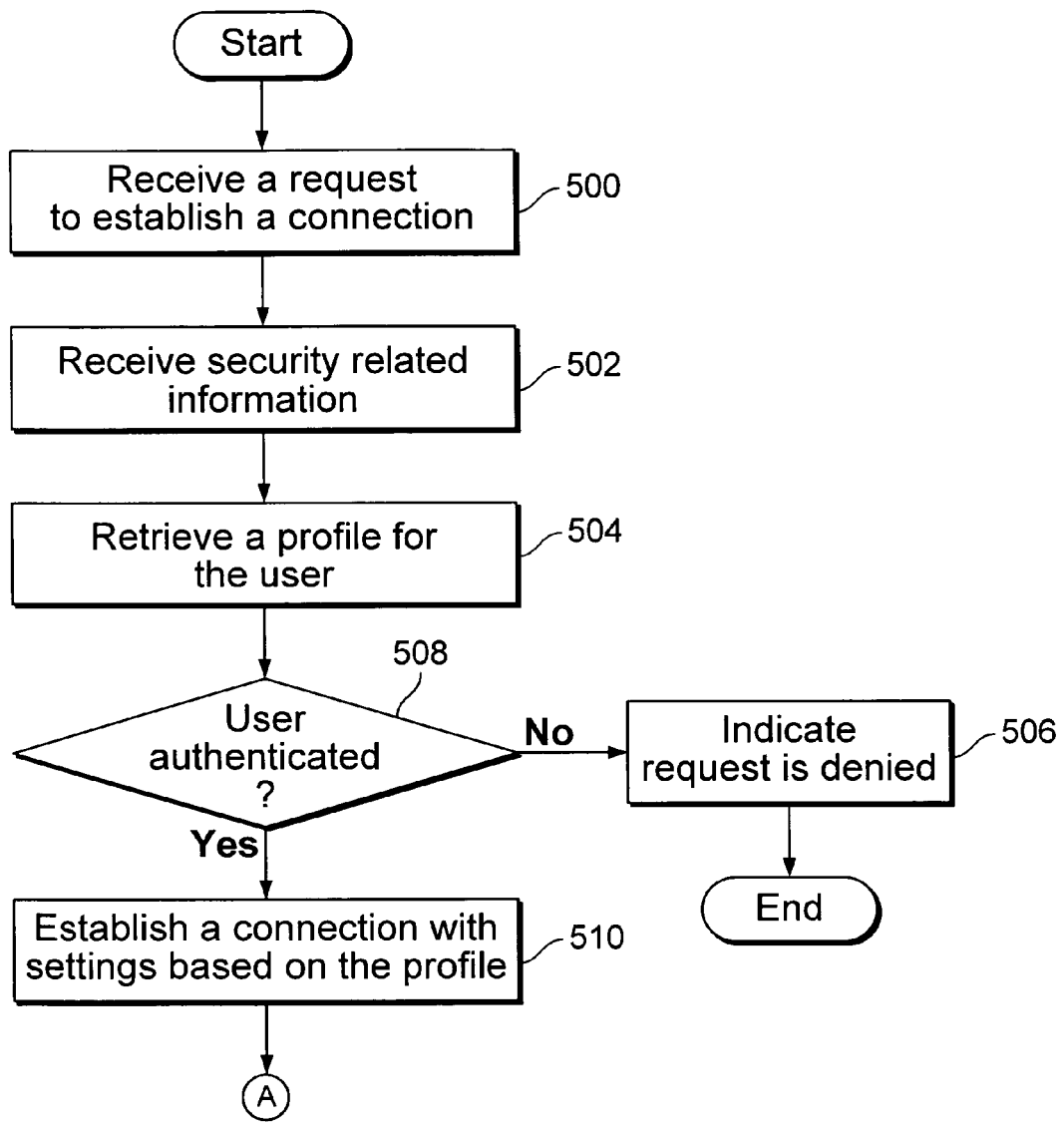
FIG. 5A is a flowchart illustrating an embodiment of a process for establishing a connection with a client running on a mobile telecommunication device.

FIG. 5A is a flowchart illustrating an embodiment of a process for establishing a connection with a client running on a mobile telecommunication device. In the example shown, the process may be performed by a backup server and/or a mobile gateway. A request to establish a connection is received at 500. For example, a client running on a mobile telecommunication device may generate a request and this request is received through a virtual client. Security related information is received at 502. In some embodiments, security related information is included in the request received at 500 to establish a connection. In some embodiments, a request for security related information is triggered when a request to establish a connection is received. Some examples of security related information include a password or a key that uniquely identifies the mobile telecommunication device. A profile is retrieved for the user at 504. For example, the profile may be retrieved from an authentication database. The profile may contain security related information (such as the user's password) or services that are available to a specific user using the client running on the mobile telecommunication device.

A user is authenticated at 508. Authentication of the user may be based on the received security related information. For example, a received password may be compared to an expected password stored in the profile for the user. A received key that uniquely identifies the mobile telecommunication device may be compared to the key for an expected mobile telecommunication device stored in the profile. In some embodiments, if a user does not use the expected mobile telecommunication device, the user is not authenticated.

If the user is not authenticated, an indication that the request is denied occurs at 506. If the user is authenticated, at 510 a connection is established with settings based on the profile. For example, the client at the mobile telecommunication device may present a menu of permitted backup services to a user after the connection is established. The backup services permitted for a specific user may depend on the profile for the user. A response to the client running on the mobile telecommunication device that the connection is established may include a list of permitted backup services.

Although the example illustrates authenticating a user and receiving security related information, in some embodiments, no security related information is exchanged. In some embodiments, requests to establish a connection or requests to access a backup and recovery service are permitted without authentication or other security related procedures.

Figure 5B:
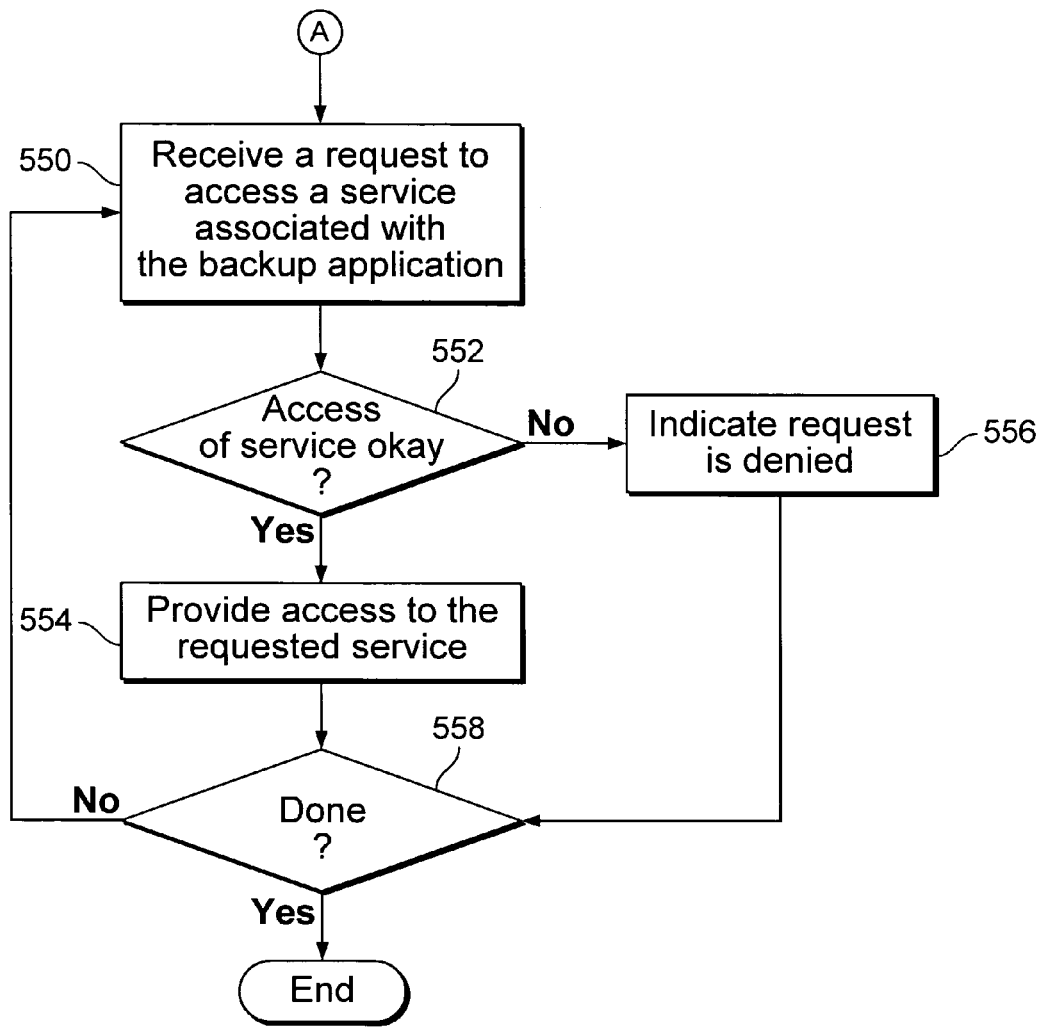
FIG. 5B is a flowchart illustrating an embodiment of a process for processing a request to access a service associated with the backup application.

FIG. 5B is a flowchart illustrating an embodiment of a process for processing a request to access a service associated with the backup application. In the example shown, the process may be performed by a backup server. A connection, for example with a client running on a mobile telecommunication device is established, e.g., as in FIG. 5A. A request to access a service associated with the backup application is received at 550. For example, the request may be to view the settings used to backup a file server. A decision if the requesting user is permitted to access the service is made at 552. For example, a retrieved profile may contain a list of backup services permitted for a specific user via a client running on a mobile telecommunication device. If it is determined at 552 that the requesting user is permitted to access the requested service, at 554 access to the requested service is provided. If it is determined at 552 that the requesting user is permitted to access the requested service, at 556 an indication the request is denied is provided. Once access to the requested service has been provided at 554 or an indication has been provided at 556 that the request is denied, at 558 it is determined whether the process is done. In some embodiments, it is determined at 558 that the process is done if an indication is received from the client and/or an associated virtual client that the user is done accessing services associated with the backup application, and/or if the connection with the client and/or the virtual client is terminated or otherwise lost. If the user is not done, control returns to 550 once another request, if any, to access a service associated with the backup application is received.

In the example illustrated in FIGS. 5A and 5B, once a connection is established, user authentication is no longer performed and requests to access a service associated with a backup application are evaluated without further user authentication. In some embodiments, there is a timeout period after which a new connection must be established before requests to access a service associated with the backup application are evaluated. The timeout period may be a period of inactivity or may be a timeout independent of user activity. In some embodiments, a user is limited to a maximum number of requests to access services associated with the backup application. The count in some embodiments only increments when backup and recovery data changes or is deleted.

In some embodiments, there is no decision to determine if the request to access a service associated with a backup application is okay. Requests to access backup services may be serviced without evaluating if the requested access is okay.

In some embodiments, continuous communication is not required for the connection to be maintained. For example, between subsequent requests to access a service associated with the backup application, there may be no communication between a client running on a mobile telecommunication device and a backup application. The connection may be maintained even while no information is exchanged.

In some embodiments, no connection is established. In some embodiments, a connection is established but the request to establish a connection is not separate from the request to access a service. The request to establish a connection may be included or implied in the request to access the backup application service.

Figure 6:
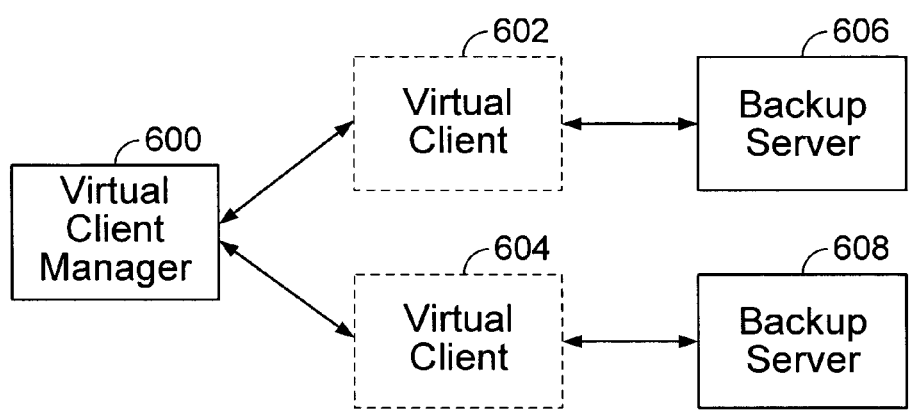
FIG. 6 is a diagram illustrating an embodiment of virtual clients used to communicate with a backup server.

FIG. 6 is a diagram illustrating an embodiment of virtual clients used to communicate with a backup server. In the example shown, virtual clients 602 and 604 are generated and managed by virtual client manager 600. Each virtual client may be associated with a different client on its respective mobile telecommunication device. Virtual client 602 communicates with backup server 606 and virtual client 604 communications with backup server 608. In some embodiments, backup servers 606 and 608 are identical. For example, a request to access a backup application service may be received from a client running on a mobile telecommunication device. Virtual client manager 600 may identify the user or the mobile telecommunication device and determine if there is an existing virtual client. If virtual client 602 is associated with the user, virtual client 602 is used to communicate the request to backup server 606. Formatting and processing to present the request according to the interface between virtual client 602 and backup server 606 may be performed.

In some embodiments, connections between virtual clients and backup servers are different from those illustrated. For example, a virtual client may be in communication with more than one backup server. In some embodiments, one backup server supports all virtual clients.

Figure 7:
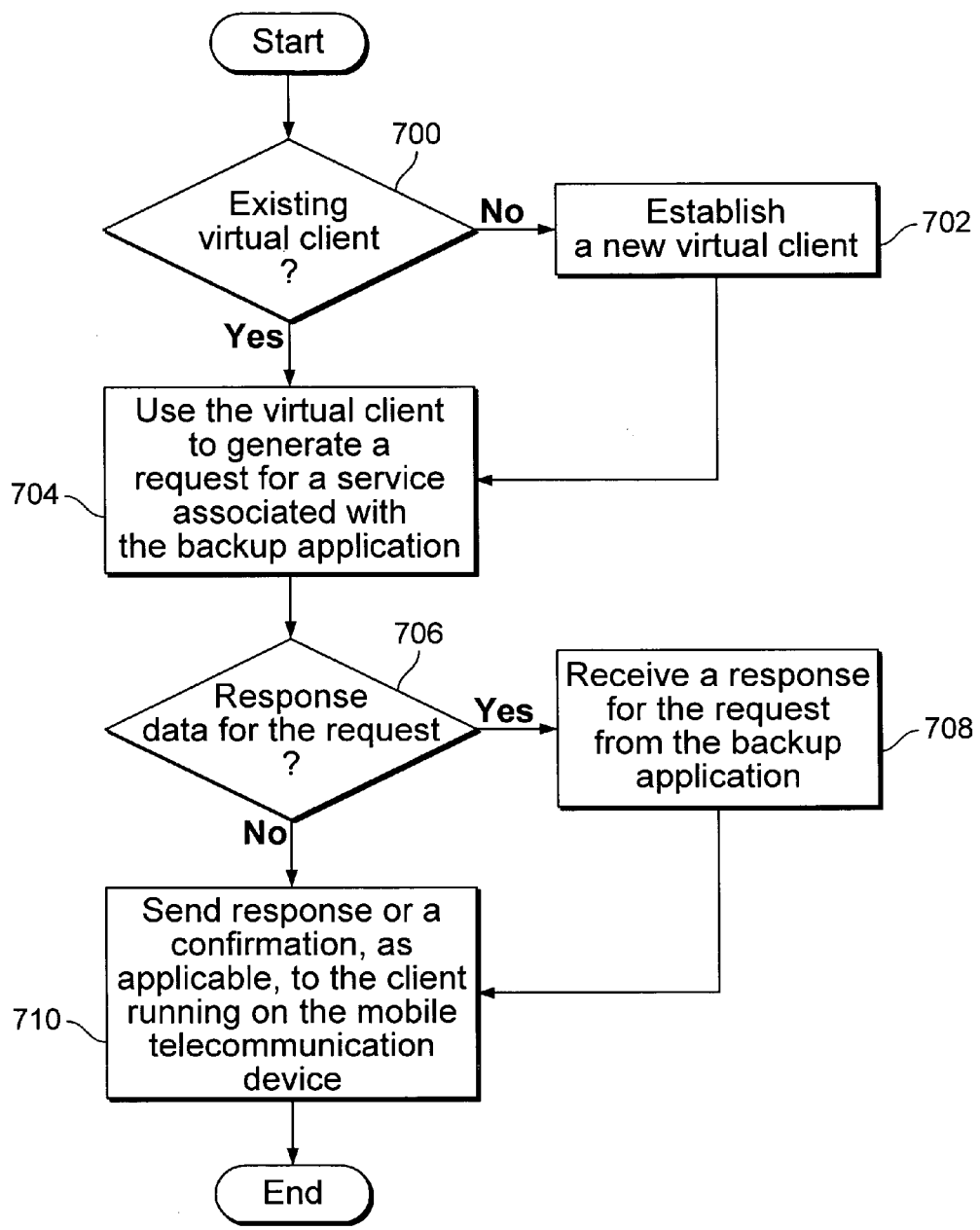
FIG. 7 is a flowchart illustrating an embodiment of a process for creating and managing a virtual client.

FIG. 7 is a flowchart illustrating an embodiment of a process for creating and managing a virtual client. In some embodiments, the process may be performed by a virtual client manager and may be triggered when a request from a client running on a mobile telecommunication device is received. In the example shown, it is determined at 700 if there is an existing virtual client. For example, user or mobile telecommunication device identification information is obtained. A list of users or mobile telecommunication devices for which there is an exiting virtual client may be checked. If there is no existing virtual client, a new virtual client is established at 702. A list of current virtual clients may also be updated. If there is an existing virtual client, or after a new virtual client is established at 702, the virtual client is used to generate a request for a service associated with the backup application at 704. For example, a request from a client running on a mobile telecommunication device may be to initiate recovery of data associated with a storage device. The request to initiate recovery is conveyed to the backup application using the appropriate virtual client. At 706, there is a decision if there is response data for the request. If there is response data then the response data is received from the backup application at 708. If there is no response data, or after the response is received at 708, the response or confirmation, as applicable, is sent to the client running on the mobile telecommunication device at 710.

Figure 8:
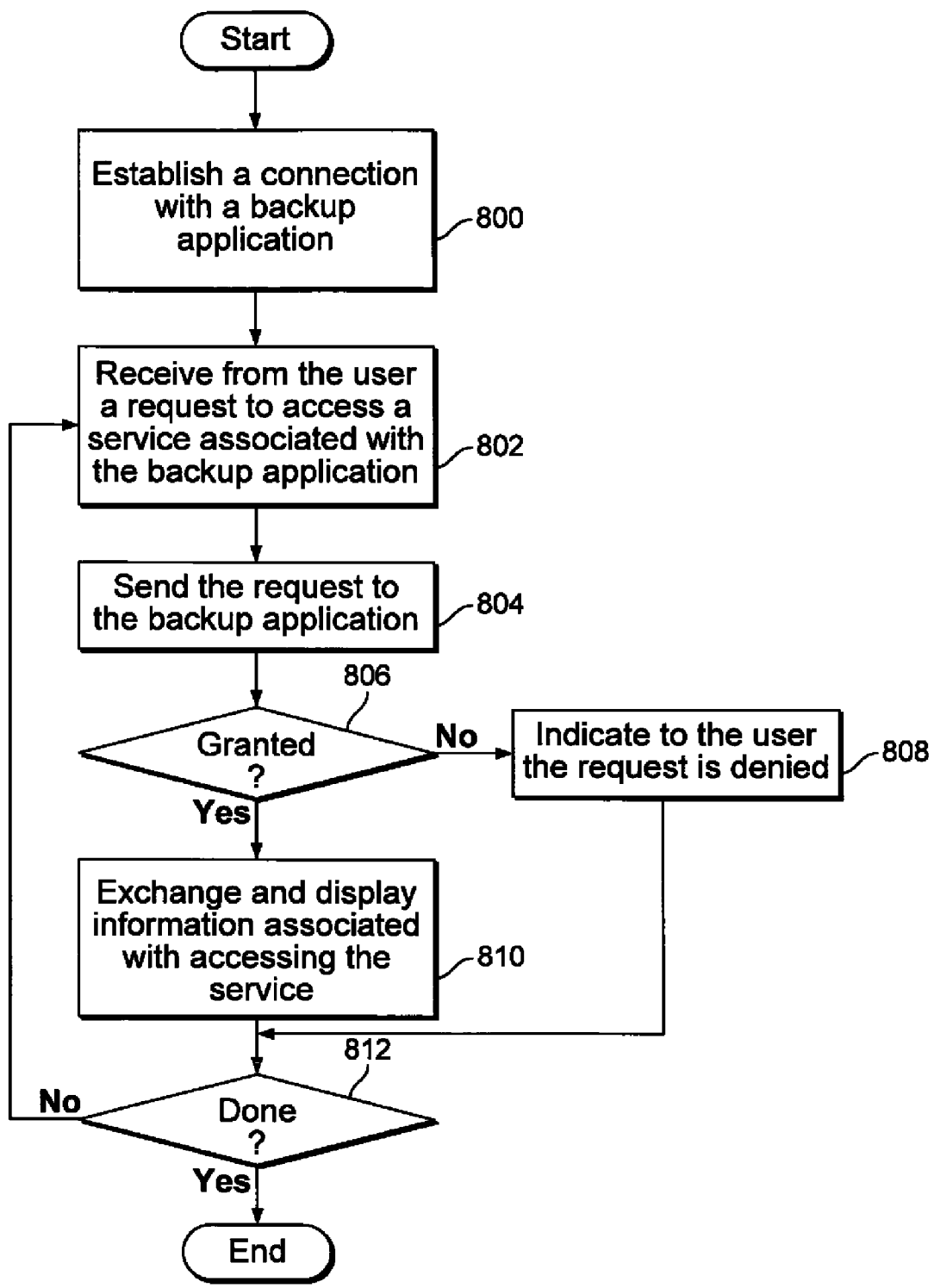
FIG. 8 is a flowchart illustrating an embodiment of a process for providing to a user of a mobile telecommunication device access to a service associated with a backup application.

FIG. 8 is a flowchart illustrating an embodiment of a process for providing to a user of a mobile telecommunication device access to a service associated with a backup application. In some embodiments, the process of FIG. 8 is implemented by a client running on a mobile telecommunication device. In the example shown, a user may start the client running on the mobile telecommunication device, access some services associated with the backup application, and close the client. A connection with a backup application is established at 800. In some embodiments, this includes communicating the user's identity and security related data with the backup application.

At 802, a request to access a service associated with the backup application is received from the user. In some embodiments, the user is presented with a user interface to access services associated with the backup application. The user interface may be graphical interface or may be text based. In some embodiments, the user is presented with a list of services associated with the backup application. For example, the list of services may be all services the user is permitted to access from the client running on the mobile telecommunication device. Any service selected and requested by the user is therefore granted by the backup application. The list may vary depending upon the user's profile stored in the authentication database. The list of services in some cases may be a default list that all users are presented with. In some embodiments, a request for a service associated with the backup application is evaluated by the client to determine if the user is allowed to access that service before the request is processed by the client, e.g., by forwarding the request to the backup application. In some embodiments, requests are not evaluated by the client and are instead passed to the backup application and/or an intermediary system, component, or software module, such as the virtual client manager described above, and the receiving application, system, component, or module evaluates the request against the user's profile, as described above. In some embodiments, a requested service is not selected by the user from a list of available services displayed on the mobile telecommunication device by the client. For example, a command line interface may be presented to the user. Entered commands may be the same commands as an existing backup user interface.

The request is sent to the backup application at 804. For example, the client running on the mobile telecommunication device may use the mobile telecommunication network to transmit the request. In some embodiments, the request is transmitted using the HTTPS protocol. From the mobile telecommunication network, the HTTPS request is routed to a mobile gateway. The mobile gateway removes the HTTPS related information and signals the request to the backup application using a virtual client.

At 806 it is determined whether the request has been granted. In some embodiments, 806 comprises receiving from the backup application an indication whether the requested service is available to the requesting user.

If the request is granted, at 810 information associated with the service is exchanged between the client and the backup application and displayed, as applicable, on the mobile telecommunication device. For example, if the user requested to view an error log, the log is transmitted from the backup application to the client running on the mobile telecommunication device. The client presents the error log to the user for viewing. If the request is not granted, at 808 an indication that the request has been denied is provided to the user, e.g., by displaying such an indication on a display associated with the mobile telecommunication device.

At 812 it is determined if the user is done. For example, the user may close the client running on the mobile telecommunication device if she is done. If she is not done, control returns to 802 once the next request, if any, to access a service associated with the backup application is received.

Some embodiments vary from the example shown in FIG. 8. For example, establishing a connection with the backup application may not be performed. In some embodiments, all requested services are known to be allowable and there is no decision whether or not to grant a request. For example, when establishing a connection, the backup application may determine services associated with the backup application permitted for that user. The client running on the mobile telecommunication device presents the permitted services to the user in a list. Any service selected and requested by the user is therefore permitted.

Figure 9A:
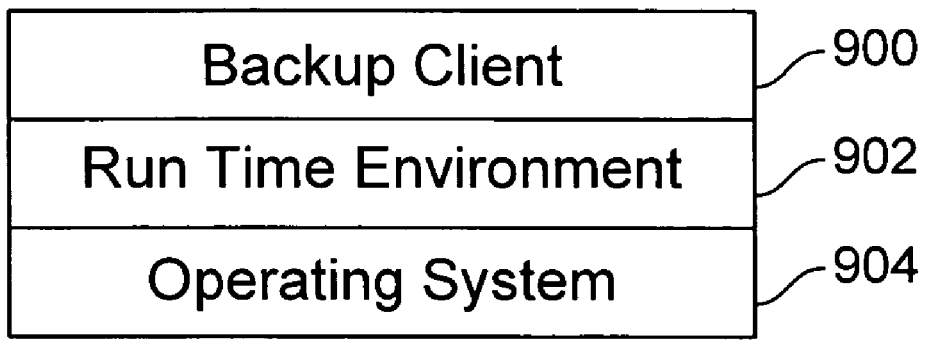
FIG. 9A is a diagram illustrating an embodiment of a backup client on a mobile telecommunication device.

FIG. 9A is a diagram illustrating an embodiment of a backup client on a mobile telecommunication device. In the example shown, operating system 904 comprises an operating system running on the mobile telecommunication device. Operating system 904 may be an operating system designed for mobile devices, such as so-called "smart" mobile phones. Compared to operating systems of computers, operating systems designed for mobile devices may consume less power, may have less processing power, and may require less memory to store (i.e., is smaller in size). Some examples of operating system 904 are Windows Mobile, Linux Mobile, Symbian OS, and Palm OS. However, operating system 904 does not have to be an operating system designed for mobile devices.

Run time environment 902 runs on top of operating system 904. Run time environments allow non-platform-specific code to be executed in the run time environment. Binary Runtime Environment for Wireless (BREW) and Java Mobile are two examples of run time environment 902. Backup client 900 is run in run time environment 902. The backup client may be an applet, an executable, or an application.

Figure 9B:
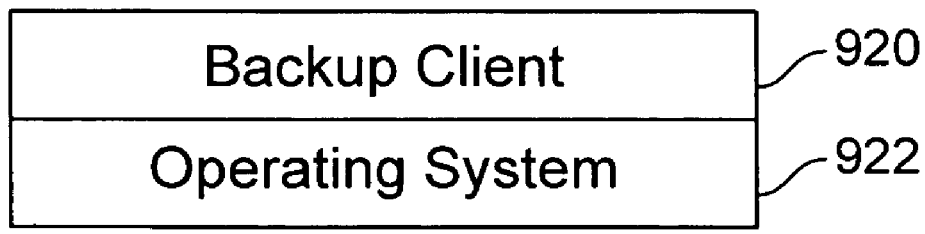
FIG. 9B is a diagram illustrating an embodiment of a backup client on a mobile telecommunication device.

FIG. 9B is a diagram illustrating an embodiment of a backup client on a mobile telecommunication device. In the example shown, backup client 920 runs directly on operating system 922. A backup client designed to run on an operating system may be optimized for that particular operating system compared to a backup client designed to run in a run time environment. The backup client may be optimized for size, performance, or a feature of the operating system not available via the run time environment.

Figure 9C:
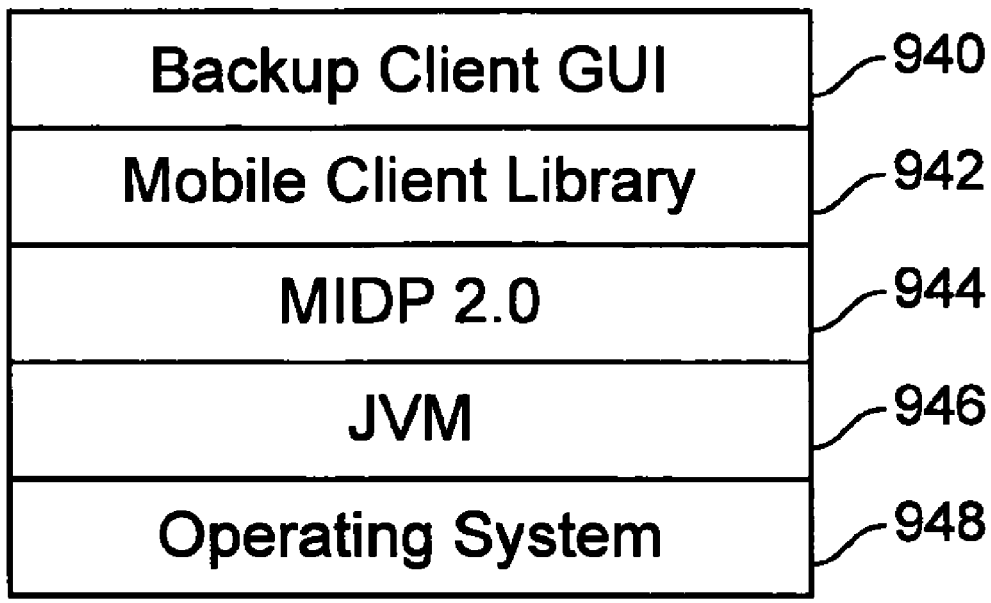
FIG. 9C is a diagram illustrating an embodiment of a backup client in a Java 2 Platform Micro Edition (J2ME) run time environment on a mobile telecommunication device.

FIG. 9C is a diagram illustrating an embodiment of a backup client in a Java 2 Platform Micro Edition (J2ME) run time environment on a mobile telecommunication device. In the example shown, a Java Virtual Machine (JVM) 946 runs on operating system 948. Above JVM 946 is the Mobile Information Device Protocol (MIDP) 2.0 944. J2ME includes a virtual machine layer, a configuration layer, and a profile layer. JVM 946 is the virtual machine layer and MIDP 944 is the configuration layer. The profile layer (not shown) may be Connected Limited Device Configuration (CLDC). Mobile client library 942 runs above MIDP 944. In some embodiments, the mobile client library provides an abstraction layer for client applications. It may encapsulate common functionality that can be easily extended and ported across different architectures (Java for MIDP and C/C++ for BREW). Using a mobile client library may reduce the difficulty of supportability testing and maintenance of the application. The library may encapsulate common functionality that can span multiple devices. In some embodiments, anything that is device specific (i.e., is not device generic) is not included in the mobile client library. Backup client graphical user interface (GUI) 940 runs above mobile client library 942.

Figure 9D:
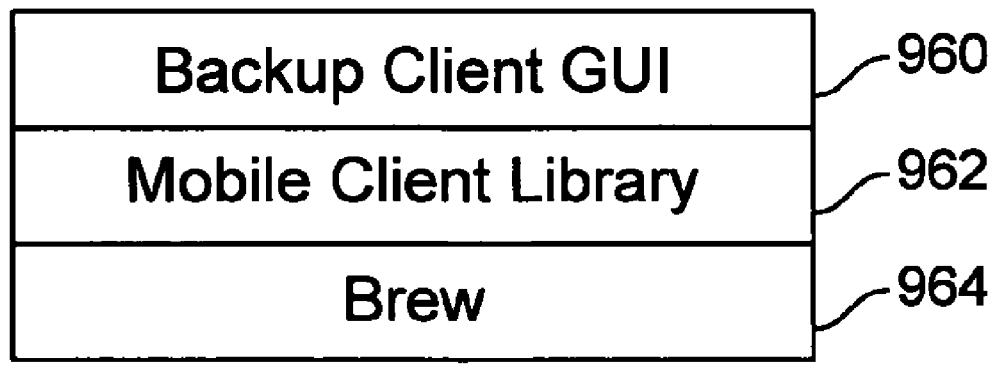
FIG. 9D is a diagram illustrating a backup client in a BREW run time environment on a mobile telecommunication device.

FIG. 9D is a diagram illustrating a backup client in a BREW run time environment on a mobile telecommunication device. In the example shown, BREW environment 964 runs on the hardware of the mobile telecommunication device (not shown). An operating system may not be required using BREW. Mobile client library 962 runs on BREW environment 964 and backup client GUI 960 runs in the BREW environment 964.

As illustrated, the backup client may run in a run time environment, such as J2ME and BREW. A backup client designed to run in a run time environment may allow better distribution across mobile telecommunication devices. Regardless of the operating system on the mobile telecommunication device (for example, Windows Mobile, Linux Mobile or Palm OS), the client is able to run on the mobile telecommunication device.

Figure 10:
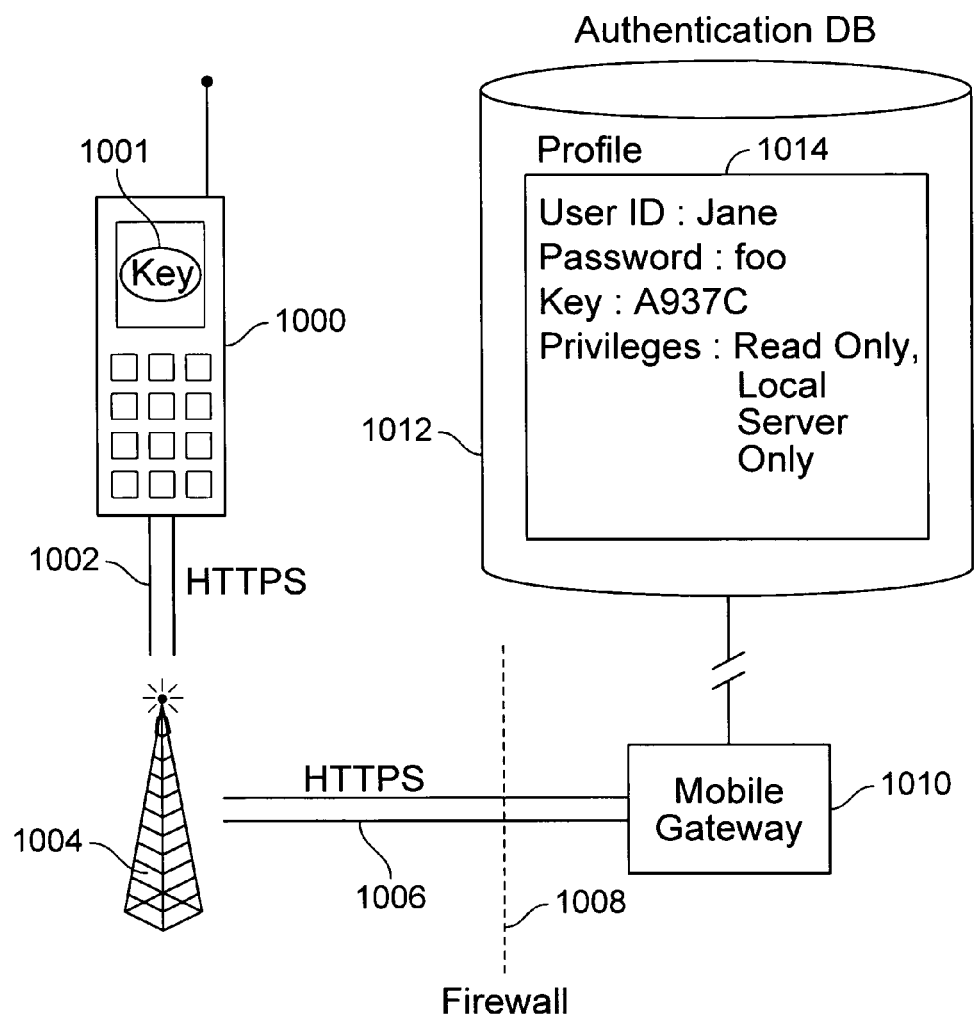
FIG. 10 is a diagram illustrating an embodiment of security measures when accessing a backup application service from a client running on a mobile telecommunication device.

FIG. 10 is a diagram illustrating an embodiment of security measures when accessing a backup application service from a client running on a mobile telecommunication device. In the example shown, a user of mobile telecommunication device 1000 desires access to a backup application service. Key 1001 may be stored on mobile telecommunication device 1000 and access to services may be permitted based on the key. The key may be static or may be updated periodically. The key may uniquely identify the mobile telecommunication device. Profile 1014 is stored in authentication database 1012. The expected value of a key stored on mobile telecommunication device 1000 is included in profile 1014. Management and storage of keys on the mobile telecommunication device may be designed so that a user is only allowed to access backup application services from approved mobile phones.

A secure connection such as HTTPS connections 1002 and 1006 may also be used. HTTPS is supported by MIDP 2.0 and allows a secure connection. In the example shown, both wireless connection 1002 between mobile telecommunication device 1000 and tower 1004 and connection 1006 between tower 1004 and mobile gateway 1010 use an HTTPS connection. Using HTTPS, communicated data is encrypted. In some embodiments, other encryptions methods are used besides or in addition to HTTPS.

Mobile gateway 1010 may include firewall 1008. Firewall 1008 may implement security measures to prevent unauthorized access to mobile gateway 1010 and other devices in communication with the mobile gateway (such as a backup server). The firewall may be part of existing security infrastructure. For example, other devices besides the mobile gateway may be protected by firewall 1008.

Password protection may also be used to secure access to services of a backup application. Profile 1014 includes a password for the user Jane. In some embodiments, a connection between a client installed on the mobile telecommunication device and the backup application is established. In the process of establishing the connection, the user may be asked for a password which is compared to the password stored in the user's profile.

User privileges based on by profile 1014 may also be used to secure access to backup application services. In the example illustrated, Jane has read-only privileges. Services that modify or delete backup or recovery related data are not permitted by Jane via the client installed on the mobile telecommunication device. In some embodiments, a user is not permitted to access some backup services (for example, services that change or delete data) from the client installed on the mobile telecommunication device, but is permitted to access the same service from another access mechanism (for example, using a website on a computer). Profile 1014 describes the backup and recovery devices Jane has access to. In the example illustrated, Jane's privileges include access to her local server only. A request to view the backup status for another server is not permitted. Although Jane is permitted to view backup status, the device is not one she is permitted to access.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing access to a backup application comprising:
   receiving via a mobile telecommunication network from a client running on a mobile telecommunication device a request to access a service associated with a backup application, wherein the client is loaded onto the mobile telecommunication device, runs on an operating system of the mobile telecommunication device, and is configured to exchange and display information associated with accessing the service associated with the backup application;
   determining information to be exchanged with the backup application in order to provide access to the service associated with the backup application; and
   communicating, on behalf of the client running on the mobile telecommunication device, with the backup application, including by exchanging with the backup application the determined information, to provide access to the service associated with the backup application.

2. A method as recited in claim 1, wherein the mobile telecommunication device comprises a mobile telephone.

3. A method as recited in claim 1, wherein the client runs in a run time environment on the mobile telecommunication device.

4. A method as recited in claim 1, wherein the client runs in a run time environment on the mobile telecommunication device and the run time environment comprises BREW.

5. A method as recited in claim 1, wherein the mobile telecommunication network comprises a GSM network.

6. A method as recited in claim 1, wherein the service associated with the backup application comprises initiating a backup.

7. A method as recited in claim 1, wherein the service associated with the backup application comprises viewing a log.

8. A method as recited in claim 1, wherein the service associated with the backup application comprises configuring a device.

9. A method as recited in claim 1, wherein the request to access a service associated with a backup application comprises an identification of a user.

10. A method as recited in claim 1 further including receiving identifying information associated with the mobile telecommunication device, wherein the identifying information is used to exchange information with the mobile telecommunication device.

11. A method as recited in claim 1, wherein communicating comprises creating a virtual client configured to communicate with the backup application on behalf of the client running on the mobile telecommunication device.

12. A method as recited in claim 1, wherein communicating comprises exchanging security related information with the backup application.

13. A method as recited in claim 1 further including determining access privileges for a user associated with the mobile telecommunication device.

14. A method as recited in claim 1 further including determining access privileges for a user associated with the mobile telecommunication device based at least in part on a profile.

15. A method as recited in claim 1 further including determining whether to grant the request to access a service associated with a backup application based at least in part on access privileges for a user associated with the request.

16. A method as recited in claim 1, wherein at least some communication with the backup application is encrypted.

17. A method as recited in claim 1, wherein a first set of services associated with the backup application that are permitted via the client installed on the mobile telecommunication device is a subset of a second set of services associated with the backup application that are permitted to be accessed in a manner other than via the client installed on the mobile telecommunication device.

18. A system for providing access to a backup application comprising:
   a communication interface configured to receive via a mobile telecommunication network from a client running on a mobile telecommunication device a request to access a service associated with a backup application, wherein the client is loaded onto the mobile telecommunication device, runs on an operating system of the mobile telecommunication device, and is configured to exchange and display information associated with accessing the service associated with the backup application; and
   a processor configured to:
      determine information to be exchanged with the backup application in order to provide access to the service associated with the backup application; and
      communicate, on behalf of the client running on the mobile telecommunication device, with the backup application, including by exchanging with the backup application the determined information, to provide access to the service associated with the backup application.

19. A system as recited in claim 18, wherein the mobile telecommunication device comprises a mobile telephone.

20. A system as recited in claim 18, wherein the client runs in a run time environment on the mobile telecommunication device.

21. A system as recited in claim 18, wherein communicating comprises creating a virtual client configured to communicate with the backup application on behalf of the client running on the mobile telecommunication device.

22. A system as recited in claim 18, wherein communicating comprises exchanging security related information with the backup application.

23. A system as recited in claim 18 wherein the processor is further configured to determine access privileges for a user associated with the mobile telecommunication device.

24. A computer program product for providing access to a backup application, the computer program product being embodied in a tangible computer readable medium and comprising computer instructions for:
   receiving via a mobile telecommunication network from a client running on a mobile telecommunication device a request to access a service associated with a backup application, wherein the client is loaded onto the mobile telecommunication device, runs on an operating system of the mobile telecommunication device, and is configured to exchange and display information associated with accessing the service associated with the backup application;
   determining information to be exchanged with the backup application in order to provide access to the service associated with the backup application; and
   communicating, on behalf of the client running on the mobile telecommunication device, with the backup application, including by exchanging with the backup application the determined information, to provide access to the service associated with the backup application.

25. A computer program product as recited in claim 24, wherein the mobile telecommunication device comprises a mobile telephone.

26. A computer program product as recited in claim 24, wherein the client runs in a run time environment on the mobile telecommunication device.

27. A computer program product as recited in claim 24, wherein communicating comprises creating a virtual client configured to communicate with the backup application on behalf of the client running on the mobile telecommunication device.

28. A computer program product as recited in claim 24, wherein communicating comprises exchanging security related information with the backup application.

29. A computer program product as recited in claim 24 further comprising computer instructions for determining access privileges for a user associated with the mobile telecommunication device.

\* \* \* \* \*